United States Patent
Yi et al.

(10) Patent No.: US 10,348,470 B2
(45) Date of Patent: *Jul. 9, 2019

(54) METHOD OF CONTROLLING A MONITORING OPERATION OF PHYSICAL DOWNLINK CHANNEL IN WIRELESS COMMUNICATION SYSTEM

(71) Applicant: LG ELECTRONICS INC., Seoul (KR)

(72) Inventors: Seung June Yi, Anyang-si (KR); Sung Duck Chun, Anyang-si (KR); Sung Hoon Jung, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 627 days.

This patent is subject to a terminal disclaimer.

(21) Appl. No.: 14/197,071

(22) Filed: Mar. 4, 2014

(65) Prior Publication Data

US 2014/0185558 A1    Jul. 3, 2014

Related U.S. Application Data

(63) Continuation of application No. 12/876,033, filed on Sep. 3, 2010, now Pat. No. 8,797,974.

(Continued)

(30) Foreign Application Priority Data

Jun. 25, 2010    (KR) .................. 10-2010-0060834

(51) Int. Cl.
*H04L 5/00* (2006.01)
*H04W 24/08* (2009.01)
(Continued)

(52) U.S. Cl.
CPC .......... *H04L 5/0053* (2013.01); *H04L 5/0094* (2013.01); *H04W 24/08* (2013.01);
(Continued)

(58) Field of Classification Search
None
See application file for complete search history.

(56) References Cited

U.S. PATENT DOCUMENTS 7,400,609 B2 *  7/2008  Hammerschmidt .. H04L 1/1607
370/338
8,009,663 B2 *  8/2011  Yamada ............ H04W 56/0005
370/350

(Continued)

FOREIGN PATENT DOCUMENTS

CN    101438511    5/2009
EP    1973355    9/2008

(Continued)

OTHER PUBLICATIONS

Canadian Intellectual Property Office Application Serial No. 2,767,736, Office Action dated Dec. 11, 2014, 3 pages.

(Continued)

*Primary Examiner* — Ayaz R Sheikh
*Assistant Examiner* — Faiyazkhan Ghafoerkhan
(74) *Attorney, Agent, or Firm* — Lee Hong Degerman Kang Waimey

(57) ABSTRACT

The present invention relates to a wireless communication system and a terminal providing a wireless communication service and to a method by which a base station and a terminal transmit and receive data in an evolved universal mobile telecommunications system evolved from universal mobile telecommunications system or a long term evolution system, and more particularly, to a method of controlling a monitoring operation of a physical downlink channel during (Continued)

a radio resource allocation procedure such that the radio resource allocation procedure can be performed with a minimum power usage by the terminal.

8 Claims, 6 Drawing Sheets

Related U.S. Application Data

(60) Provisional application No. 61/239,796, filed on Sep. 4, 2009, provisional application No. 61/242,397, filed on Sep. 15, 2009.

(51) Int. Cl.
*H04W 72/12* (2009.01)
*H04W 76/28* (2018.01)
*H04W 52/02* (2009.01)
*H04W 72/04* (2009.01)

(52) U.S. Cl.
CPC ....... *H04W 72/1289* (2013.01); *H04W 76/28* (2018.02); *H04W 52/0216* (2013.01); *H04W 52/0235* (2013.01); *H04W 72/04* (2013.01); *Y02D 70/1242* (2018.01); *Y02D 70/1262* (2018.01); *Y02D 70/146* (2018.01); *Y02D 70/24* (2018.01)

(56) References Cited

U.S. PATENT DOCUMENTS

| | | | | |
|---|---|---|---|---|
| 8,089,921 B2* | 1/2012 | Yamada | ............ | H04W 56/0005 370/328 |
| 8,797,974 B2* | 8/2014 | Yi | ............ | H04W 24/08 370/329 |
| 9,088,998 B2* | 7/2015 | Baker | ............ | H04W 72/1221 |
| 2008/0049671 A1* | 2/2008 | Koo | ............ | 370/329 |
| 2008/0186892 A1* | 8/2008 | Damnjanovic | ... | H04W 52/0216 370/311 |
| 2008/0247320 A1* | 10/2008 | Grah | ............ | H04L 41/5012 370/241 |
| 2008/0273482 A1* | 11/2008 | Lee | ............ | H04W 72/005 370/312 |
| 2009/0176502 A1* | 7/2009 | Kuo | ............ | H04W 72/14 455/450 |
| 2009/0196244 A1* | 8/2009 | Chun | ............ | H03M 13/09 370/329 |
| 2009/0196256 A1* | 8/2009 | DiGirolamo | ............ | H04W 78/28 370/331 |
| 2009/0204862 A1* | 8/2009 | Chun | ............ | H04L 1/1822 714/748 |
| 2009/0232118 A1* | 9/2009 | Wang | ............ | H04L 5/0091 370/338 |
| 2009/0239568 A1* | 9/2009 | Bertrand | ............ | H04W 52/0225 455/522 |
| 2009/0280798 A1* | 11/2009 | Meylan | ............ | H04W 72/1284 455/422.1 |
| 2009/0285180 A1* | 11/2009 | Zhang | ............ | H04W 74/004 370/331 |
| 2009/0316593 A1* | 12/2009 | Wang | ............ | H04W 74/0833 370/252 |
| 2009/0316638 A1* | 12/2009 | Yi | ............ | H04W 74/002 370/329 |
| 2010/0029278 A1* | 2/2010 | Fang | ............ | H04W 36/0055 455/436 |
| 2010/0070814 A1* | 3/2010 | Damnjanovic | ......... | H04L 1/188 714/748 |
| 2010/0080185 A1* | 4/2010 | Guo | ............ | H04L 1/1848 370/329 |
| 2010/0098051 A1* | 4/2010 | Uemura | ............ | H04W 56/0015 370/350 |
| 2010/0110897 A1* | 5/2010 | Chun | ............ | H04L 43/0811 370/241 |
| 2010/0111067 A1* | 5/2010 | Wu | ............ | H04W 74/008 370/345 |
| 2010/0254321 A1* | 10/2010 | Kim | ............ | H04L 47/14 370/329 |
| 2010/0255850 A1* | 10/2010 | Kaukoranta | ...... | H04W 72/1268 455/450 |
| 2010/0322086 A1* | 12/2010 | Harris | ............ | H04L 1/0004 370/252 |

FOREIGN PATENT DOCUMENTS

| | | | | |
|---|---|---|---|---|
| EP | 2079270 | | 7/2009 | |
| EP | 2136592 A1 | * | 12/2009 | .......... H04W 74/002 |
| JP | 2006-270820 | | 10/2006 | |
| JP | 2009-165134 | | 7/2009 | |
| KR | 1020090033126 | | 4/2009 | |
| KR | 1020090076826 | | 7/2009 | |
| KR | 1020090084701 | | 8/2009 | |
| WO | 2008132685 | | 11/2008 | |
| WO | 2009/096731 | | 8/2009 | |
| WO | WO 2009154412 A3 | * | 4/2010 | .......... H04W 74/002 |
| WO | WO 2010043963 A1 | * | 4/2010 | ........ H04W 72/1242 |

OTHER PUBLICATIONS

Samsung, "DRX operation during UL transmission", 3GPP TSG-RAN2 Meeting #61, Tdoc R2-080822, Feb. 5, 2008, 4 pages.
Ericsson, "Handling of PUCCH resources in DRX", 3GPP TSG-RAN WG2 #60, Tdoc R2-074934, Nov. 12, 2007, 2 pages.
LG Electronics Inc., "SR procedure and DRX procedure", 3GPP TSG-RAN WG2 #67bis, R2-095694, Oct. 6, 2009, 2 pages.
European Patent Office Application No. 10813981.7, Search Report dated Apr. 12, 2016, 11 pages.
European Patent Office Application Serial No. 10813981.7, Office Action dated Jul. 3, 2017, 6 pages.
European Patent Office Application Serial No. 10813981.7, Search Report dated Apr. 12, 2016, 11 pages.
European Patent Office Application Serial No. 10813981.7, Patent Certificate dated Dec. 26, 2018, 12 pages.
Intellectual Property Office of India Application Serial No. 4951CHENP/2012, Office Action dated Nov. 14, 2017, 7 pages.
Samsung, "DRX operation during UL transmission", 3GPP TSG RAN WG2 Meeting #61, Tdoc R2-080822, Feb. 2008, 4 pages.
Ericsson, :Handling of PUCCH resources in DRX, 3GPP TSG RAN WG2 Meeting #60, Tdoc R2-074934, Nov. 2007, 2 pages.
LG Electronics, "SR procedure and DRX procedure", 3GPP TSG RAN WG2 Meeting #67bis, R2-095694, Oct. 2009, 2 pages.

* cited by examiner

METHOD OF CONTROLLING A MONITORING OPERATION OF PHYSICAL DOWNLINK CHANNEL IN WIRELESS COMMUNICATION SYSTEM

CROSS REFERENCE TO RELATED APPLICATIONS

This application is a continuation of U.S. patent application Ser. No. 12/876,033, filed on Sep. 3, 2010, now U.S. Pat. No. 8,797,974, which claims the benefit of earlier filing date and right of priority to Korean Application No. 10-2010-0060834, filed on Jun. 25, 2010, and also claims the benefit of U.S. Provisional Application Ser. No. 61/239, 796, filed on Sep. 4, 2009, and 61/242,397, filed on Sep. 15, 2009, the contents of which are all incorporated by reference herein in their entirety.

TECHNICAL FIELD

The present invention relates to a wireless communication system and a mobile terminal providing a wireless communication service and to a method by which a base station and a mobile terminal transmit and receive data in an evolved universal mobile telecommunications system (E-UMTS) evolved from universal mobile telecommunications system (UMTS) or a long term evolution (LTE) system, and more particularly, to a method of controlling a monitoring operation of a physical downlink channel, thereby minimizing a power consumption of the mobile terminal.

BACKGROUND ART

FIG. 1 shows a network structure of the E-UMTS, a mobile communication system, applicable to the related art and the present invention. The E-UMTS system has been evolved from the UMTS system, for which the $3^{rd}$ Generation Partnership Program (3GPP) is proceeding with the preparation of the basic specifications. The E-UMTS system may be classified as the LTE system.

The E-UMTS network may be divided into an evolved-UMTS terrestrial radio access network (E-UTRAN) and a core network (CN). The E-UTRAN includes a terminal (referred to as User Equipment (UE), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A Packet Data Convergence Protocol (PDCP) layer of the second layer performs a header compression function to reduce the size of a header of an Internet protocol (IP) packet including sizable unnecessary control information, to thereby effectively transmit an IP packet such as Internet protocol version 4 (IPv4) or Internet protocol version 6 (IPv6) in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UMPS Terrestrial Radio Access Network (UTRAN).

According to a radio resource allocation request method in a related art, after requesting a radio resource allocation to a network, a terminal must continuously monitor a downlink channel until it receives the allocated radio resource. However, during a radio resource allocation procedure, the terminal can not possibly receive the radio resource immediately after requesting the radio resource allocation. Therefore, an operation of continuously monitoring the downlink channel may cause an unnecessary power consumption of the terminal.

DISCLOSURE OF THE INVENTION

Therefore, an object of the present invention is to minimize an unnecessary power consumption of a mobile terminal by controlling a monitoring operation of a physical downlink channel effectively.

To achieve these and other advantages and in accordance with the purpose of the present invention, as embodied and broadly described herein, there is provided a method of controlling a monitoring operation of a physical downlink channel in wireless communication system, the method comprising: triggering a signaling in order to allocate at least one radio resource for an uplink data transmission; determining whether the triggered signaling is being transmitted to a network; and selectively performing the monitoring operation of the physical downlink channel based on the determining step.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Figure 1:
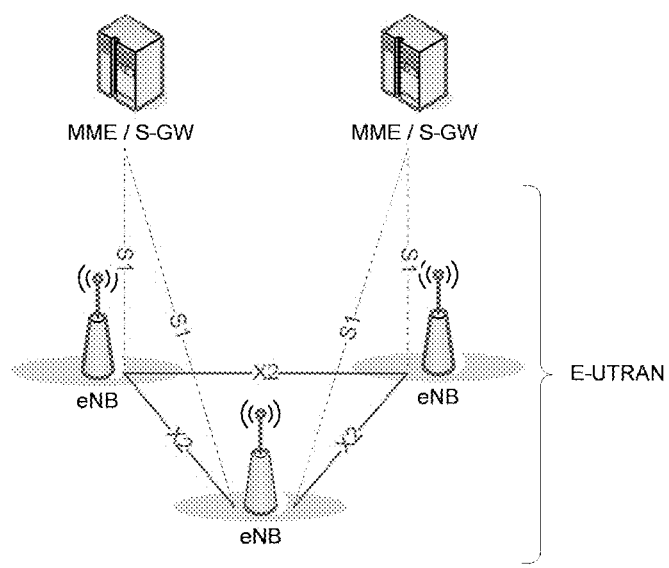
FIG. 1 shows a network structure of an E-UMTS, a mobile communication system, applicable to the related art and the present invention.
Figure 2:
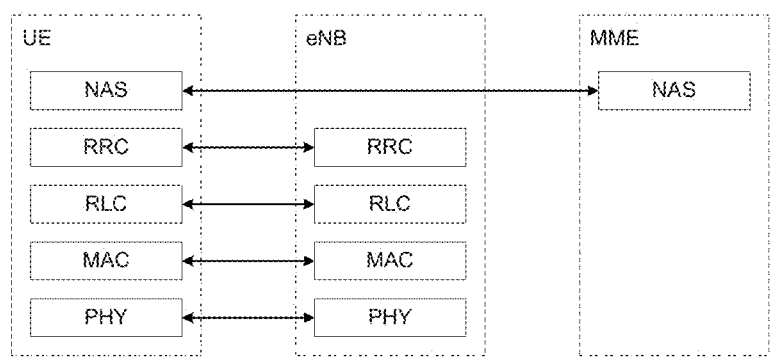
FIG. 2 shows an exemplary structure of a control plane of a radio interface protocol between a UE and a UTRAN based on 3GPP radio access network standards according to the related art.
Figure 3:
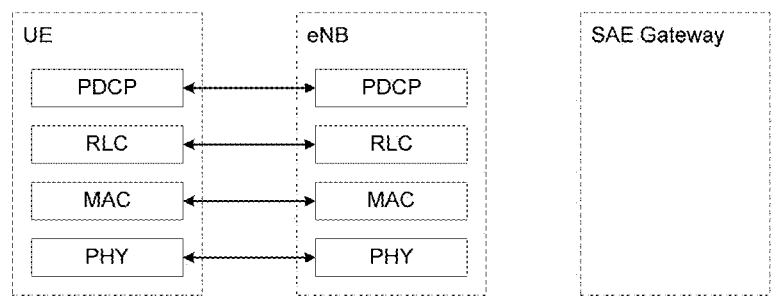
FIG. 3 shows an exemplary structure of a user plane of the radio interface protocol between the UE and the UTRAN based on 3GPP radio access network standards according to the related art.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, in the LTE system, in order to effectively use radio resources, the base station should know which and how many data each user wants to transmit. In case of downlink data, the downlink data is transferred from an access gateway to the base station. Thus, the base station knows how many data should be transferred to each user through downlink. Meanwhile, in case of uplink data, if the UE does not directly provide the base station with information about data the UE wants to transmit to uplink, the base station cannot know how many uplink radio resources are required by each UE. Thus, in order for the base station to appropriately allocate uplink radio resources to the UEs, each UE should provide information required for the base station to schedule radio resources to the base station.

To this end, when the UE has data to be transmitted, it provides corresponding information to the base station, and the base station transfers a resource allocation message to the UE based on the received information.

In this process, namely, when the UE informs the base station that it has data to be transmitted, the UE informs the base station about the amount of data accumulated in its buffer. It is called a buffer status report (BSR).

The BSR is generated in the format of a MAC control element, included in a MAC protocol data unit (PDU), and transmitted from the UE to the base station. Namely, uplink radio resources are required for the BSR transmission, which means that uplink radio resource allocation request information for BSR transmission should be sent. If there is allocated uplink radio resource when the BSR is generated, the UE would transmit the BSR by using the uplink radio resource. The procedure of sending the BSR by the UE to the base station is called a BSR procedure. The BSR procedure starts 1) when every buffer does not have data and data is newly arrived to a buffer, 2) when data is arrived to a certain empty buffer and a priority level of a logical channel related to the buffer is higher than a logical channel related to the buffer previously having data, and 3) when a cell is changed. In this respect, with the BSR procedure triggered, when uplink radio resources are allocated, if transmission of all the data of the buffer is possible via the radio resources but the radio resources are not sufficient to additionally include the BSR, the UE cancels the triggered BSR procedure.

However, if there is no allocated uplink radio resource when the BSR is generated, the UE performs an SR procedure (i.e., resource allocation request procedure).

The SR procedure includes two methods: one is using a D-SR (Dedicated Scheduling Request) channel set for a physical uplink control channel (PUCCH), and the other is using a random access channel (RACH) process. Namely, when the SR procedure is triggered and the D-SR channel has been allocated, the UE sends a radio resource allocation request by using the D-SR channel, whereas if the D-SR channel has not been allocated, the UE starts the RACH procedure. In case of using the D-SR channel, the UE transmits a radio request allocation signal on uplink via the D-SR channel. The SR procedure may be continuously performed until the UE is allocated uplink shared channel (UL-SCH) resources.

Figure 4:
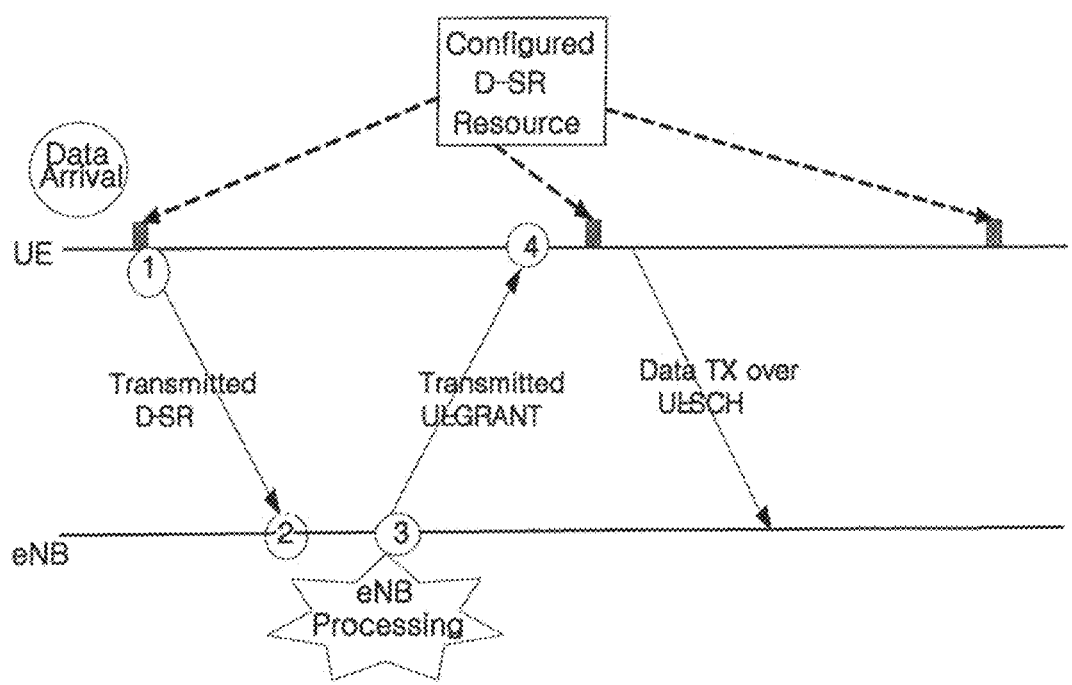
FIG. 4 illustrates a scheduling request (SR) procedure using a dedicated-scheduling request (D-SR) channel.

FIG. 4 illustrates a scheduling request (SR) procedure using a dedicated-scheduling request (D-SR) channel.

As illustrated in the FIG. 4, a base station (e.g. eNB) may allocate a configured D-SR channel resource to a terminal (UE) periodically. If the terminal has data to be transmitted in an uplink direction and radio resource(s) have not been allocated to the terminal, the terminal may transmit the data in the uplink direction by using the configured D-SR channel resource. If the terminal does not have data to be transmitted, the terminal does not use the configured D-SR channel resource. After receiving the D-SR channel from the terminal, the base station may determine a radio resource distribution according to a scheduling algorithm, and may notify an amount of allocated uplink radio resource to the terminal through a physical downlink control channel (PDCCH).

Hereafter, some concepts of discontinuous reception (DRX) will be explained. The DRX refers to discontinuous reception and signifies the operations about when (i.e. at when point in time) the base station should send information related to radio resource allocation to the mobile station during the process of communication between the base station and the mobile terminal.

Namely, a mobile terminal having to always monitor the downlink channel (e.g., PDCCH), would result in undesirable power consumption for the mobile terminal. Thus, to resolve this issue, the mobile terminal and the base station operate according to pre-established consistent rules, such that the base station sends radio resource allocation information via the PDCCH to the mobile terminal only at specific times. As a result, the mobile terminal only needs to monitor the PDCCH at certain specified times, which reduces power consumption thereof.

In general, the UE may be configured by the RRC with a DRX functionality that allows it to not continuously monitor the PDCCH. In the LTE system, the DRX functionality may consist of a Long DRX cycle, a DRX Inactivity Timer, a DRX Retransmission Timer, and optionally a Short DRX Cycle and a DRX Short Cycle Timer.

Here, an Active Time will be explained. The active time may refer to a specific time that the UE should wake up and monitor a downlink channel (e.g., PDCCH). Any other time except for the active time, the UE does not need to monitor the downlink channel.

The active time may include the following types of time periods:

1) a time during which an On-Duration timer, or a DRX Inactivity timer, or a DRX Retransmission timer, or a Contention Resolution timer operates;

2) a time during which a Scheduling Request procedure is being performed;

3) a time during which a radio resource allocation message (for retransmissions) is sent, with respect to uplink transmissions;

4) a time during from after the RACH resource message (MSG-2) is transmitted up to the time when a cell radio network temporary identifier (C-RNTI) or a Temporary C-RNTI (that indicates the allocation of radio resources for an initial or new transmission) is received.

When a DRX cycle is configured, the UE shall perform the following procedures for each sub-frame (i.e., transmission time interval (TTI)):

if a short DRX cycle is used: start the On Duration Timer when [(SFN*10)+sub-frame number] modulo (current DRX Cycle)=DRX Start Offset;

if a hybrid automatic repeat request (HARQ) round trip time (RTT) Timer expires in this sub-frame and the data in the soft buffer of the corresponding HARQ process was not successfully decoded: start the DRX Retransmission Timer for the corresponding HARQ process;

if a DRX Command MAC control element is received: stop the On Duration Timer; stop the DRX Inactivity Timer;

if the DRX Inactivity Timer expires or a DRX Command MAC control element is received in this sub-frame: if the short DRX cycle is configured: if the DRX Short Cycle Timer is not running, start the DRX Short Cycle Timer; use the Short DRX Cycle, else: use the Long DRX cycle;

if the DRX Short Cycle Timer expires in this sub-frame: use the long DRX cycle;

during the Active Time, for a PDCCH-sub-frame except if the sub-frame is required for uplink transmission for half-duplex frequency-division duplex (FDD) UE operation: monitor the PDCCH;

if the PDCCH indicates a downlink (DL) transmission: start the HARQ RTT Timer for the corresponding HARQ process; stop the DRX Retransmission Timer for the corresponding HARQ process;

if the PDCCH indicates a new transmission (uplink (UL) or DL): start or restart the DRX Inactivity Timer.

if a DL assignment has been configured for this sub-frame and no PDCCH indicating a DL transmission was successfully decoded: start the HARQ RTT Timer for the corresponding HARQ process.

A radio resource allocation request procedure will be explained. When a terminal (UE) request a radio resource allocation to a base station through a D-SR channel, the terminal may continuously monitor a downlink channel until a completion of radio resource allocation. However, in general, the terminal does not receive the radio resource immediately after transmitting the radio resource allocation request.

In the FIG. 4, it takes approximately 7-8 ms from a time that the terminal (UE) uses a D-SR channel (time (1)) to a time that the UE actually receives a radio resource allocation (time (4)) with including a signaling delay time and a base station's processing time. Accordingly, the terminal can not receive a radio resource allocation message from the base station (i.e., eNB) immediately after transmitting the radio resource allocation request. However, in general, the terminal continuously monitors a downlink channel, and this cause an unnecessary consumption of the terminal's power.

Figure 5:
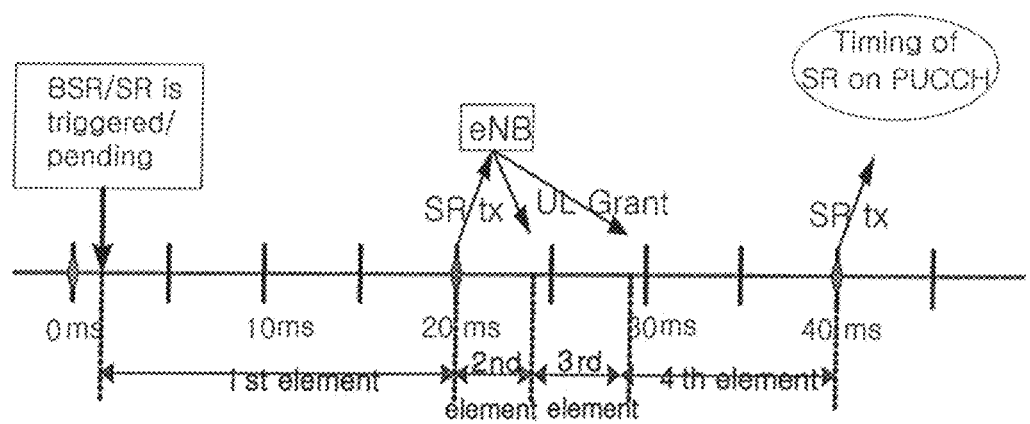
FIG. 5 illustrates a radio resource allocation procedure after triggering of a buffer status report (BSR) and an SR.

FIG. 5 illustrates a radio resource allocation procedure after triggering of BSR and an SR.

As shown in the FIG. 5, the radio resource allocation procedure may be divided into 4 different time period.

The first time period may refer to a time period from a time that a BSR/SR is triggered or pending to a first available time that SR can be transmitted on a PUCCH. In general, the first time period may be varied according to a setup of the radio resource(s) allocation of the PUCCH for transmitting the SR request. In the FIG. 5, it is assumed that the PUCCH radio resource(s) are allocated at 0 ms, 20 ms, 40 ms. Here, if the SR is triggered at 2 ms, the terminal does not perform any operation from 2 ms to 20 ms, because the SR only can be actually transmitted to the base station at 20 ms. However, in general, the terminal continuously monitors a downlink channel (e.g., PDCCH) during this period, and such unnecessary monitoring operation of the terminal may cause unnecessary power consumption.

The second time period may refer to a time period from a time that the SR is transmitted to a first available time that the terminal can receive a uplink grant (UL grant) message from a base station (e.g., eNB). In general, the second time period may be related to an uplink/downlink RTT and/or a processing time by the base station. Accordingly, after transmitting the SR, there is some time delay that the terminal has to wait for receiving the radio resource allocation message. However, in general, the terminal also continuously monitor this time period as well. Therefore, just like the first time period, an unnecessary power consumption of the terminal may be caused in the second time period as well.

The third time period may refer to a time period from the first available time that the terminal can receive the UL grant message to a time that the terminal actually receives its own radio resource allocation message (or information) from the base station. Here, the radio resource allocation message is received from the base station after the base station successfully decodes the previously transmitted SR. As such, unlike the first and second time period, the terminal must monitor and receive the downlink channel during the third time period.

The fourth time period may refer to a time period from the time that the terminal actually receives its own radio resource allocation message to a next available time that the terminal can transmit the SR on the PUCCH (if the previous SR transmission is failed). If the previously transmitted SR is not received by the base station, the terminal may not able to receive the radio resource allocation message. In this case, a monitoring of the downlink channel during this time period may be an unnecessary operation.

As described above, during a radio resource allocation procedure, a monitoring operation of the terminal for a downlink channel (e.g., PUCCH) may not be necessary for a certain time period. Namely, if the terminal continuously monitors the downlink channel for entire time period, it will cause unnecessary battery consumption of the terminal.

Accordingly, the present disclosure may propose an improved radio resource allocation method with high power efficiency. To do this, the present disclosure may propose to control a downlink channel monitoring time by using a timer.

Preferably, after transmitting an SR through a PUCCH, the terminal may operate a sleep mode timer, and immediately operates in a continuous reception mode. Then, if the sleep mode timer expires, the terminal may stop the continuous reception mode and may change its operation in a discontinuous reception mode. If the terminal receives the radio resource allocation from the base station during the operation of the sleep mode timer, the terminal may stop to operate the sleep mode timer.

Preferably, after transmitting an SR through a PUCCH, the terminal may operate a sleep stop timer. Thereafter, the terminal may operate in a discontinuous reception mode or may stop to monitor the downlink channel such as the PDCCH. Then, if the sleep stop timer expires, the terminal may operate in a continuous reception mode, thereby continuously monitoring the downlink channel. During the above procedure, as an additional step, the terminal may operate the sleep mode timer when the sleep stop timer is expired. Then, if the sleep mode timer expires, the terminal may stop to operate the continuous reception, and may change its operation in a discontinuous reception mode. If the terminal receives the radio resource allocation from the base station during the operation of the sleep mode timer, the terminal may stop to operate the sleep mode timer.

Preferably, after requesting a radio resource allocation through a D-SR channel, if the terminal is in a first discontinuous reception mode (e.g., long DRX), the terminal may change its operation in a second discontinuous reception mode (e.g., short DRX).

During the above procedure, a setup value of the timer may be notified to a terminal by a base station. Also, a setup value of the reception stop timer (or sleep stop timer) may set to a RTT of a HARQ operation.

According to the present disclosure, after the SR is triggered, if a certain condition is satisfied, the terminal may monitor or receive a downlink channel. Also, according to the present disclosure, the terminal may not monitor or receive the downlink channel if the certain condition is not satisfied. Here, the certain condition may refer to a specific time or case when the terminal transmits the SR through the PUCCH and/or the transmission of the SR is pending.

Figure 6:
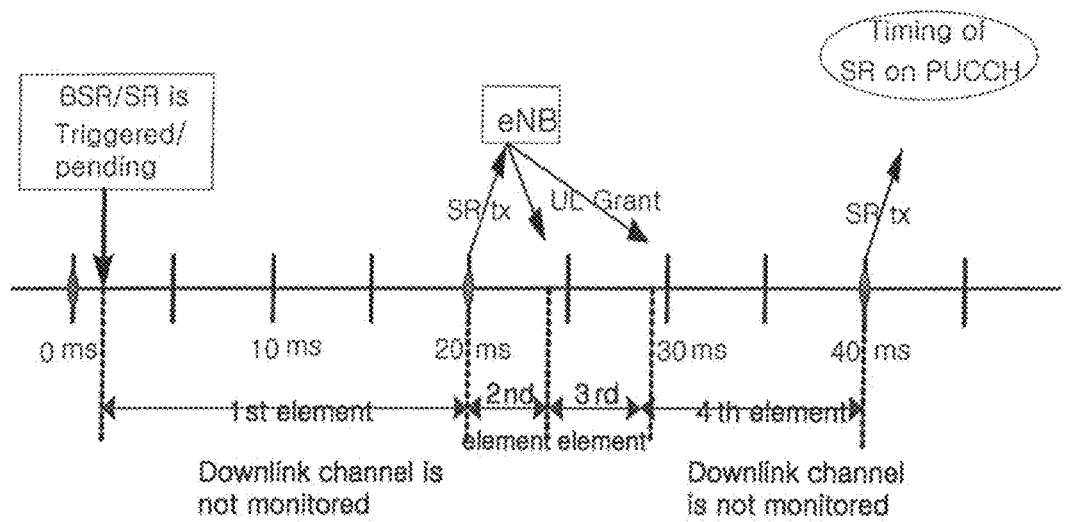
FIG. 6 illustrates a radio resource allocation procedure after triggering of a buffer status report and an SR according to an embodiment of the present invention.

FIG. 6 illustrates a radio resource allocation procedure after triggering of a BSR and an SR according to an embodiment of the present invention.

As shown in the FIG. 6, the radio resource allocation procedure may be divided into 4 different time period.

The first time period may refer to a time period from a time that a BSR (buffer state report)/SR (scheduling request) is triggered or pending to a first available time that SR can be transmitted on a PUCCH. In general, the first time period may be varied according to a setup of the radio resource(s) allocation of the PUCCH for transmitting the SR request. In the FIG. 5, it is assumed that the PUCCH radio resource(s) are allocated at 0 ms, 20 ms, 40 ms. Here, if the SR is triggered at 2 ms, the terminal does not perform any operation from 2 ms to 20 ms, because the SR only can be actually transmitted to the base station at 20 ms. As described above, according to the present disclosure, the monitoring operation for a downlink channel is not performed for this period so as to minimize an unnecessary power consumption of the terminal.

The second time period may refer to a time period from a time that the SR is transmitted to a first available time that the terminal can receive a UL grant message from a base station (e.g., eNB). In general, the second time period may be related to an uplink/downlink RTT and/or a processing time by the base station. Accordingly, after transmitting the SR, there is some time delay that the terminal has to wait for receiving the radio resource allocation message. As described above, according to the present disclosure, the monitoring operation for a downlink channel is also not performed for this period so as to minimize an unnecessary power consumption of the terminal.

The third time period may refer to a time period from the first available time that the terminal can receive the UL grant message to a time that the terminal actually receives its own radio resource allocation message (or information) from the base station. Here, the radio resource allocation message is received from the base station after the base station successfully decodes the previously transmitted SR. As such, unlike the first and second time period, according to the present disclosure, the terminal performs monitoring operation for the downlink channel during the third time period.

The fourth time period may refer to a time period from the time that the terminal actually receives its own radio resource allocation message to a next available time that the terminal can transmit the SR on the PUCCH (if the previous SR transmission is failed). According to the present disclosure, in order to eliminate the unnecessary power consumption of the terminal, the monitoring operation of the terminal is not performed for this time period.

In the present disclosure, the SR may be used for requesting an uplink shared channel (e.g., UL-SCH) resources for new transmission. Further, when the SR is triggered, it may be considered as pending until it is cancelled. All pending SR(s) may be cancelled and a scheduling request prohibit timer may be stopped when a data unit (e.g., MAC PDU) is assembled and this data unit includes a BSR which contains buffer status up to (including) the last event that triggered BSR, or when the uplink grant can accommodate all pending data available for transmission.

The present disclosure may provide a method of controlling a monitoring operation of a physical downlink channel in wireless communication system, the method comprising: triggering a signaling in order to allocate at least one radio resource for an uplink data transmission; determining whether the triggered signaling is being transmitted to a network; and selectively performing the monitoring operation of the physical downlink channel based on the determining step, wherein the monitoring operation is performed if it is determined that the triggered signaling is transmitted to the network, the monitoring operation is not performed if it is determined that the triggered signaling is not transmitted to the network, the signaling is transmitted to a network via a PUCCH, the signaling is an SR signaling, the physical downlink channel is a PDCCH, and the signaling is related to an SR procedure.

Although the present disclosure is described in the context of mobile communications, the present disclosure may also be used in any wireless communication systems using mobile devices, such as personal digital assistants (PDAs) and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, time division multiple access (TDMA), code division multiple access (CDMA), frequency-division multiple access (FDMA), wideband code division multiple access (WCDMA), orthogonal frequency-division multiplexing (OFDM), Evolution-Data Optimized (EV DO), Worldwide Interoperability for Microwave Access (WiMax), wireless broadband (WiBro), etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (Compact Disc Read-Only memory (CD ROMs), optical disks, etc.), volatile and non-volatile memory devices (e.g., Electrically Erasable Programmable Read-Only Memory (EEPROMs), read only memory (ROM), random access memory (RAM), programmable read only memory (PROM), static random access memory (SRAM), dynamic random access memory (DRAM), firmware, programmable logic, etc.

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of monitoring a downlink channel in a wireless communication system, the method comprising:
   triggering, by a user equipment (UE), a scheduling request (SR) signaling;
   transmitting, by the UE, the triggered SR signaling to a network after the triggering of the SR signaling;
   starting a timer when the triggered SR signaling is transmitted; and
   monitoring, by the UE, the downlink channel while the SR is pending, the SR being pending starting when the triggering is started, the SR being cancelled and the timer being stopped at the earliest of when an UL grant is received by the UE and when a data unit including a buffer status report is generated by the UE.

2. The method of claim 1, wherein the SR signaling is used for requesting the one or more uplink resources for an uplink data transmission.

3. The method of claim 1, wherein the triggered SR signaling is transmitted to the network via a physical uplink control channel (PUCCH).

4. The method of claim 1, wherein the downlink channel is a physical downlink control channel (PDCCH).

5. An apparatus for monitoring a downlink channel in a wireless communication system, the apparatus comprising:
   a processor configured to
      trigger a scheduling request (SR) signaling,
      transmit the triggered SR signaling to a network after the triggering of the SR signaling,
      start a timer when the triggered SR signaling is transmitted, and
      monitor the downlink channel while the SR is pending, the SR being pending starting when the triggering is started, the SR being cancelled and the timer being stopped at the earliest of when an UL grant is received by the UE and when a data unit including a buffer status report is generated by the UE.

6. The apparatus of claim 5, wherein the SR signaling is used for requesting one or more uplink resources for an uplink data transmission.

7. The apparatus of claim 5, wherein the triggered SR signaling is transmitted to the network via a physical uplink control channel (PUCCH).

8. The apparatus of claim 5, wherein the downlink channel is a physical downlink control channel (PDCCH).

* * * * *